United States Patent [19]

Britsch

[11] 4,433,081

[45] Feb. 21, 1984

[54] ELECTRICAL INSULATION BODY

[75] Inventor: Helmut Britsch, Schinznach-Dorf, Switzerland

[73] Assignee: BBC Brown, Boveri & Company, Limited, Baden, Switzerland

[21] Appl. No.: 343,266

[22] Filed: Jan. 27, 1982

[30] Foreign Application Priority Data

Feb. 11, 1981 [CH] Switzerland .......................... 922/81

[51] Int. Cl.$^3$ .......................... C08K 3/36; C08K 3/10

[52] U.S. Cl. .......................... 523/457; 174/17 GF; 174/DIG. 1; 200/148 G

[58] Field of Search .................. 523/457; 174/DIG. 1, 174/17 GF, 110 E; 200/148 G, 151

[56] References Cited

U.S. PATENT DOCUMENTS

| | | | |
|---|---|---|---|
| 3,318,995 | 5/1967 | Buckley et al. | 174/DIG. 1 |
| 3,339,013 | 6/1963 | Gainer et al. | 523/457 |
| 3,557,447 | 11/1968 | Gruber et al. | 174/179 |
| 4,042,550 | 8/1977 | Tuller et al. | 523/457 |

FOREIGN PATENT DOCUMENTS

| | | | |
|---|---|---|---|
| 666517 | 7/1963 | Canada | 174/DIG. 1 |
| 2810035 | 9/1979 | Fed. Rep. of Germany . | |
| 51-19099 | 2/1976 | Japan | 523/457 |
| 1213625 | 11/1970 | United Kingdom | 174/DIG. 1 |
| 1240403 | 7/1971 | United Kingdom | 174/DIG. 1 |

*Primary Examiner*—Lewis T. Jacobs
*Attorney, Agent, or Firm*—Burns, Doane, Swecker & Mathis

[57] ABSTRACT

Provided is an electrical insulation body useful in electrical installations operated with $SF_6$ as a quenching and/or insulating gas. The insulation body is comprised of a thermosetting resin matrix and a mineral filler of predominantly quartz powder and from about 5 to 50 percent by weight of the mineral filler of a second mineral powder component for increasing resistance to $SF_6$ cleavage products, which second component comprises at least one alkaline earth metal carbonate.

10 Claims, No Drawings

ELECTRICAL INSULATION BODY

BACKGROUND AND SUMMARY OF THE INVENTION

Electrical installations run at medium or high voltage levels, such as transformers and in particular switches, are frequently operated with sulfur hexafluoride ($SF_6$) as a quenching or insulating gas for such installations, which are appropriately sealed against leakage of $SF_6$ gas.

The insulating materials in such installations must cope with relatively higher field strengths than in open or unsealed installations which do not employ $SF_6$, as the superior stability or breakdown strength of $SF_6$ as compared to air cannot otherwise be exploited. However, due to arcing or other forms of discharge and via the hydrolysis of decomposition products, as a result of the virtual impossibility of attaining an absolute seal against moisture, the $SF_6$ can form cleavage products in such installations. Of such cleavage products, hydrogen fluoride (HF) can cause particular problems for the insulators.

Swiss patent specification No. 466,391 discloses the use of insulation bodies made from a cured casting resin, such as an epoxy resin, which is free of components, and in particular silicon compounds, which can react with the cleavage products of the insulator gas in an attempt to eliminate the problems caused by such products. For example, $Al_2O_3$ in the form of technical grade corundum powder or in the form of clay is used instead of $SiO_2$, which, particularly when in the form of quartz powder, is itself a very advantageous filler for casting resins.

Moreover, U.S. Pat. No. 4,102,851 discloses insulation bodies for use in gaseous $SF_6$ environments which utilize a thermosetting resin matrix of a cycloaliphatic epoxy resin and aluminum hydroxide, $Al(OH)_3$, and/or natural magnesite ($MgCO_3$) as an additive to the mineral filler consisting predominantly of extremely finely divided $Al_2O_3$. The use of $SiO_2$ as a mineral filler component is mentioned only in the case of a comparative example.

Furthermore, German Offenlegungsschrift No. 2,810,035 proposes using dolomite powder ($MgCO_3.$-$CaCO_3$ in various, for example stoichiometric, proportions) as a filler in materials molded from an epoxy resin and used in installations which employ $SF_6$, with the relative loss of strength resulting from the use of dolomite powder (as compared to $SiO_2$ as a filler) being compensated to some extent by certain organic processing auxiliaries. The content of $SiO_2$ which may be present in the mineral dolomite, however, should be below 1% by weight.

Finally, U.S. Pat. No. 4,104,238 discloses the use of a second mineral powder, aluminum hydroxide, $Al(OH)_3$, as a means for compensating for the disadvantages of using pulverulent $SiO_2$ (in the form of quartz material) as a main component of the mineral filler used in insulation materials employed in gaseous $SF_6$ environments. A hydantoin epoxy resin serves as the thermosetting resin matrix.

There are thus two methods in accordance with the state of the art for increasing the resistance of insulation bodies to $SF_6$ cleavage products. In one method, $SiO_2$ is virtually eliminated as a filler component of the thermosetting resin matrix and replaced by other mineral fillers. However, such fillers are comparatively expensive and/or result in a reduction of strength as compared to using $SiO_2$.

In the other method, $SiO_2$ still serves as the predominant mineral filler, i.e., it comprises at least half ($\geqq 50\%$) of the mineral filler, with a second mineral powder component being used to increase the resistance of the insulation body to $SF_6$ cleavage products. However, the effectiveness of aluminum hydroxide, proposed as the second mineral component in addition to $SiO_2$, in increasing the resistance of the insulation body to $SF_6$ cleavage products is limited.

Accordingly, the object of the present invention is to provide an electrical insulation article or body having increased resistance to $SF_6$ cleavage products wherein a second mineral component is employed which contributes more effectively to increase the resistance of the insulation body to $SF_6$ cleavage products, and in particular hydrogen fluoride.

This object is achieved in accordance with the present invention by employing from 5 to 50 percent by weight of the mineral filler, and preferably from about 10 to about 30 percent by weight of the mineral filler, of at least one alkaline earth metal carbonate as a second mineral component of the filler.

DETAILED DESCRIPTION OF THE INVENTION

For the purposes of the present invention, calcium and magnesium are the preferred alkaline earth metals. Mixtures of carbonates of alkaline earth metals, and in particular of calcium carbonate and/or magnesium carbonate, are also preferred for the purposes of the present invention. Dolomite, which is disclosed in the abovementioned German Offenlegungsschrift No. 2,810,035 as being useful as a filler in the virtual absence of $SiO_2$ for insulating bodies resistant to $SF_6$ cleavage products, and which contains calcium carbonate and magnesium carbonate in various proportions, for example, as a double carbonate in approximately stoichiometric proportions, is very suitable for the present invention. The use of dolomite provides the insulation body with a considerably increased resistance to hydrogen fluoride, a particularly corrosive $SF_6$ cleavage product, when used in accordance with the present invention in relatively minor amounts of from about 10 to 30% by weight of the mineral filler, which therefore hardly detracts from the high initial strength achieved in a thermosetting resin matrix filled with quartz powder as the filler.

In general, the polymer compositions which are suitable as thermosetting resins for the matrix, i.e., the surrounding continuous phase, of an insulating body according to the present invention are those which due to crosslinking are virtually infusible, virtually insoluble in organic media and substantially inert to chemical influences, and in particular hydrolysis.

Thermosetting resins which can be derived from known and commercially available polyeproxides with the aid of appropriate crosslinking agents or curing agents, i.e., those generally employed in casting resin compositions or reactive resin compositions, are preferred for many applications. Specific examples can be found in the aforementioned publications concerning the state of the art. Crosslinked polyurethanes and crosslinked polyesters are other thermosetting resins which in principle are suitable for use in accordance with the present invention.

The suitable curing agents for crosslinking the thermosetting resin precursors or prepolymers of the afore-discussed thermosetting resins are also known and commercially available. In general, thermosetting resin systems are preferred which crosslink at elevated temperatures, for example in the range of from about 120° to 180° C.

Insulation bodies in accordance with the present invention can be produced in general by known methods of thermosetting resin processing. Casting processes are mentioned as a preferred example.

The mineral filler mixture employed in the formulation of the insulation bodies of the present invention comprises from 50 to 95 percent, and more preferably from 70 to 90 percent of the total weight of the mineral filler, of quartz powder, for example, in a ground and screened form with particle sizes ranging from about 2 to 70 μm. The second component of the mineral filler, for example ground dolomite, can have particle sizes less than or within the aforementioned range for the quartz powder.

The weight ratio of the thermosetting matrix to the mineral filler is generally in the range of from about 1:3 to 3:1, and, if appropriate, the ratio is such that the viscosity of the mixture of the thermosetting resin precursor (without the curing agent) and the mineral filler is sufficient fro the selected processing method, for example, casting, with the matrix having the desired strength after crosslinking.

It is preferred that the distribution of filler throughout the matrix is as homogeneous as possible, i.e., aggregates of filler granules are avoided. It is theorized that the particles of the alkaline earth metal compound shield the particles of the quartz powder against the effect of $SF_6$ cleavage products, and in particular HF, by the formation of an alkaline earth metal fluoride. In other words, the alkaline earth metal carbonates are believed to act as interceptors for the $SF_6$ cleavage products and thus advantageously surround the grains of the quartz powder spatially. For this reason, it may be advantageous to use a relatively coarse quartz powder and a relatively fine calcium carbonate and/or magnesium carbonate as the mineral filler.

The example below serves to illustrate the invention in greater detail, but is nowise limitative. Percentages and parts are by weight unless otherwise indicated.

EXAMPLE

Insulation bodies in accordance with the present invention and corresponding bodies intended for comparison purposes which were not in accordance with the present invention were produced according to the following general procedure.

A prepolymer which is curable via thermosetting and which is based on an epoxide (a commercially available product) was liquified without the addition of a curing agent by warming to about 150° C. The clear melt obtained was mixed with a mineral pulverulent filler. The resulting mixture was then subjected, in the form of a warm melt, to a vacuum treatment to virtually completely remove volatile contents, including moisture.

The temperature for this pretreatment was typically 140°±10° C. and its duration was 150±30 minutes; the vacuum was usually between 0.1 and 1.5 mbars, the treatment usually being started at the higher pressure of, for example, 1.5 mbars, which was then lowered during the course of the treatment to a pressure of 0.1 mbar. A vacuum in the range of from about 0.13 to 1.3 mbars is preferred, but it must be stressed that in practice the optimum conditions can be readily adapted based upon the amount of resin employed and the dielectric requirements.

The mixture subjected to the pretreatment was then allowed to cool to about 130° C., mixed with a curing agent suitable for an epoxy, in the present instance a dicarboxylic acid anhydride, and cast into preheated (140°±20° C.) molds.

The thermosetting resin/filler composition was cured in an oven maintained at 150°±30° C., which, depending upon the specific curing temperature within the range just mentioned, can take 180 minutes to 24 hours.

After cooling, the bodies obtained were removed from the molds.

In order to compare the mechanical properties of insulation bodies according to the present invention and with those not in accordance with the present invention, corresponding sample pieces were tested for characteristic parameters, such as flexural strength, deflection at break, modulus of elasticity (flexure), impact strength and heat distortion resistance, by the test methods indicated in Table I below.

Variable production and composition parameters, with the exception of the composition of the filler content, were kept at constant values for all sample pieces. The weight ratio of the thermosetting resin matrix to mineral filler was 4:6.

The thermosetting resin matrix was formed in each case from 10 parts by weight of prepolymer and 3.5 parts by weight of curing agent. The granularity of all mineral fillers or filler components was greater than 2 but less than 70 μm. The mechanical properties of the samples were measured at room temperature (20° C.).

TABLE I

| | | | Composition of the mineral filler | | | |
|---|---|---|---|---|---|---|
| Characteristic parameter | Test method | Unit of measurement | $SiO_2$* (100%) (comparison) | $Al_2O_3$** (100%) (comparison) | 90% of $SiO_2$ and 10% of Microdol (invention***) | 70% of $SiO_2$ and 30% of Microdol (invention***) |
| Flexural strength | ISO 178 | MPa | 130 | 119 | 132 | 121 |
| Modulus of elasticity (flexure) | ISO 178 | MPa × $10^3$ | 10 | 10 | 9 | 10 |
| Impact strength | ISO 179 | KJ/$M^2$ | 8 | 8 | 7 | 7 |
| Heat distortion resistance, according to | VSM 77,116**** | °C. | 108 | 110 | 106 | 104 |

TABLE I-continued

| Characteristic parameter | Test method | Unit of measurement | Composition of the mineral filler | | | |
|---|---|---|---|---|---|---|
| | | | $SiO_2$* (100%) (comparison) | $Al_2O_3$** (100%) (comparison) | 90% of $SiO_2$ and 10% of Microdol (invention***) | 70% of $SiO_2$ and 30% of Microdol (invention***) |
| Martens | | | | | | |

*$SiO_2$ in the form of quartz powder
**$Al_2O_3$ in the form of commercial corundum powder
***Microdol is a trademark for dolomite powder ($CaCO_3/MgCO_3$)
****VSM (Verein Schweizerischer Maschinenindustrieller [Association of Swiss Machine Manufacturers]

The vlues listed in Table I show that the characteristic mechanical values of insulation bodies in accordance with the present invention which have a Microdol content of 10% of the weight of the total amount of filler virtually do not differ from the advantageous mechanical properties of a thermosetting resin matrix filled only with quartz powder and are, at a Microdol content of 30% of the weight of the total amount of filler, still better than those of a thermosetting resin matrix filled with corundum power.

In order to examine the effects of the second mineral powder component according to the present invention with regard to resistance of the insulation bodies to the corrosiveness of $SF_6$ cleavage products, the insulation structures tested in accordance with Table I were stored for a relatively long period of time at room temperature over 30% strength aqueous hydrogen fluoride (HF) solution in diffusion-proof test chambers resistant to hydrofluoric acid, and then tested for changes in flexural strength.

The results are listed in Table II below and they show that the use, according to the present invention, of calcium carbonate/magnesium carbonate (in the form of dolomite powder) in a mixture with quartz powder offers a marked improvement not only compared with quartz powder (as 100% of the filler) but also compared with corundum powder (as 100% of the filler).

TABLE II

| Storage period over 30% HF | Characteristic parameter (ISO 178, measured at room temperature) | Unit of measurement | Composition of the mineral filler | | | |
|---|---|---|---|---|---|---|
| | | | $SiO_2$* (100%) | $Al_2O_3$** (100%) | 90% of $SiO_2$ and 10% of Microdol*** | 70% of $SiO_2$ and 30% of Microdol*** |
| As new | Flexural strength | MPa | 130 | 119 | 132 | 121 |
| 1 day | Flexural strength | MPa | 123 | 115 | 124 | 123 |
| 1 week | Flexural strength | MPa | 106 | 105 | 114 | 113 |
| 4 weeks | Flexural strength | MPa | 86 | 79 | 95 | 107 |

*$SiO_2$ in the form of quartz powder
**$Al_2O_3$ in the form of commercial corundum powder
***Microdol is a trademark for dolomite powder ($CaCO_3/MgCO_3$)

It must be stressed that the conditions used for determining the test data of Table II are more severe, that is to say more corrosive, by several orders of magnitude than the concentrations of HF, by far the most corrosive $SF_6$ cleavage product with respect to $SiO_2$, resulting from the decomposition of $SF_6$ via the arcing of an electrical switching station.

However, it is precisely the extremely high HF concentration in the runs of Table II in comparison with actual operating conditions which shows that the addition of fast-reacting alkaline earth metal compounds to quartz powder markedly reduces the corrosion of the filler caused by hydrogen fluoride, with the resultant protection of the matrix being obtained thereby. It is thus possible, in accordance with the present invention, to commercially employ quartz powder very advantageously as the main filler in casting resin molding materials used in the production of electrical insulation bodies, which bodies have an increased resistance to $SF_6$ cleavage products.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. An electrical insulation body in an environment of $SF_6$ gas comprising a matrix of a thermoset resin and a mineral filler, with the mineral filler comprising predominantly quartz powder and from about 5 to 50 percent by weight of said mineral filler of a second mineral powder component for increasing resistance to $SF_6$ cleavage products, which component comprises at least one alkaline earth metal carbonate.

2. The insulation body of claim 1, wherein the second mineral powder component comprises from about 10 to about 30 percent by weight of the mineral filler.

3. The insulation body of claim 1 or 2 wherein the resin matrix is comprised of a crosslinked epoxy resin.

4. The insulation body of claim 1 or 2, wherein the second mineral powder component is calcium carbonate, magnesium carbonate or a mixture thereof.

5. The insulation body of claim 4, wherein the second mineral powder component is pulverulent dolomite.

6. The insulation body of claim 4, wherein the resin matrix is comprised of a crosslinked epoxy resin.

7. The insulation body of claim 4, wherein the granularity of the second mineral powder component is of a finer nature than the quartz powder.

8. An electrical installation including at least one electrical insulator in contact with a sealed environment containing gaseous sulfur hexafluoride, said insulator comprising a matrix of a thermoset resin and a mineral particulate filler distributed homogeneously throughout the matrix, the improvement which comprises said mineral particulate filler in the matrix comprising a predominant amount of quartz powder and from about 5 to 50 percent by weight, based upon the total weight of said mineral particulate filler, of a second mineral powder which is comprised of at least one alkaline earth metal carbonate.

9. The electrical installation of claim 8, wherein the second mineral powder comprises calcium carbonate, magnesium carbonate or a mixture thereof and wherein the amount of second mineral powder ranges from about 10 to about 30 percent by weight.

10. The electrical installation of claim 8, wherein the alkaline earth metal carbonate is dolomite powder.

* * * * *